Dec. 27, 1938.  O. D. SISSON  2,142,010
APPARATUS FOR CLEANING SAND
Original Filed April 16, 1936   2 Sheets—Sheet 1

Inventor
Orta D. Sisson

By Eccleston + Eccleston
Attorneys

Dec. 27, 1938.   O. D. SISSON   2,142,010
APPARATUS FOR CLEANING SAND
Original Filed April 16, 1936    2 Sheets-Sheet 2
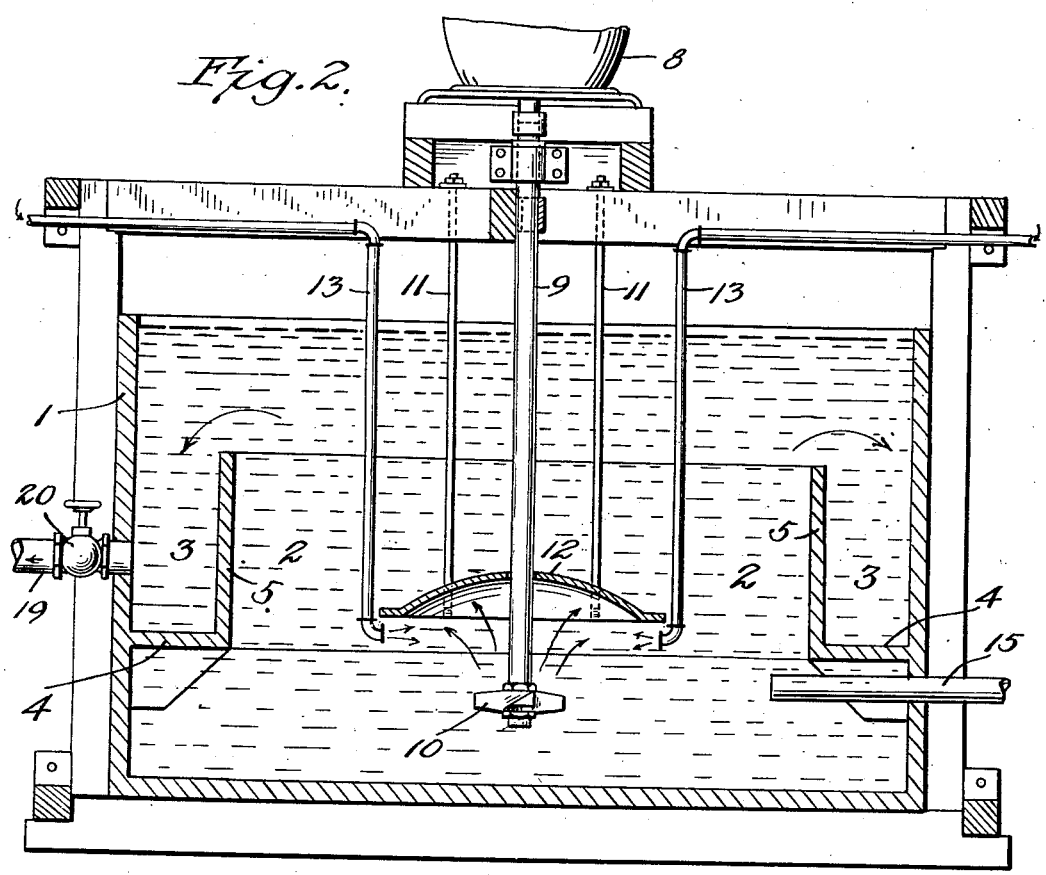
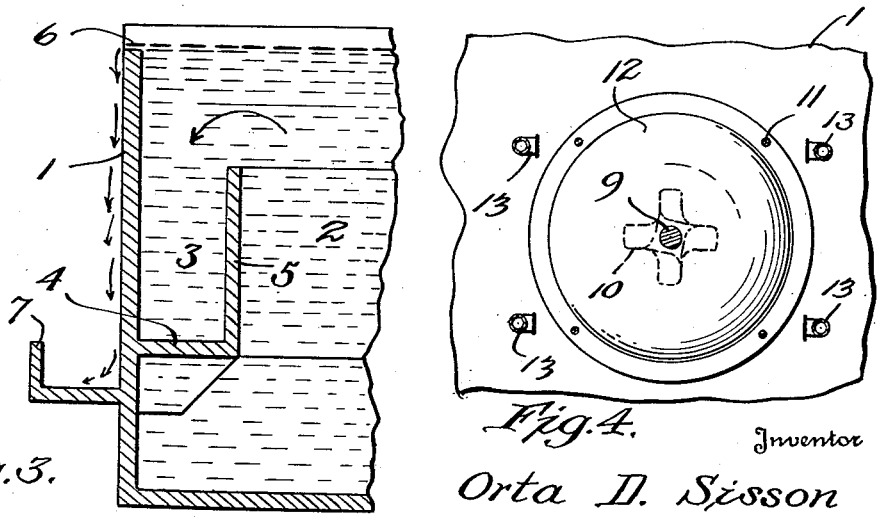
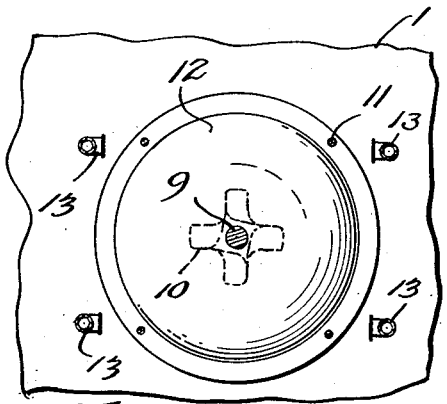
Inventor
Orta D. Sisson
By Eccleston & Eccleston
Attorneys Patented Dec. 27, 1938

2,142,010

UNITED STATES PATENT OFFICE 2,142,010

APPARATUS FOR CLEANING SAND

Orta D. Sisson, Oakland, Calif., assignor to Hazel-Atlas Glass Company, Wheeling, W. Va., a corporation of West Virginia Original application April 16, 1936, Serial No. 74,747. Divided and this application October 8, 1936, Serial No. 104,729

5 Claims. (Cl. 209—169)

This application is a division of my application Serial Number 74,747, filed April 16, 1936.

The invention relates particularly to an apparatus for cleaning sand for use in the manufacture of glassware, but it is to be understood that wherever the word "sand" appears herein, either in the specification or claims, it is intended to also include clay and clayey substances.

In the manufacture of glassware it is of the utmost importance that the proper quality of sand be employed. The requirements with respect to the sand introduced in the melting tank are very strict, for a good grade of glassware cannot be produced if the sand is poor. One of the most important requirements is that the sand used in the batch shall be of low iron content. In many instances it is necessary to import the sand from foreign countries, such as Belgium, because of the high transportation charges between the glass sand plant and the glass factory.

The purpose of the present invention is to provide an apparatus by which sand having an iron content too high for glass use can be efficiently and inexpensively treated to so reduce its iron content that it can be used as glass sand, or in other cases will reduce the iron content to such an extent that it can be mixed in large proportions with glass sand. The object of the invention is not only to remove iron and other impurities from the sand, but also by reducing the size of the larger grains to thereby produce a uniform range of grain size.

The apparatus constituting the present invention will be clearly understood from the following detailed description, when taken in connection with the accompanying drawings, in which, Figure 1 is a perspective view of the apparatus.

Figure 2 is a vertical sectional view thereof.

Figure 3 is a fragmentary sectional view; and

Figure 4 is a fragmentary horizontal sectional view illustrating the dome or baffle and the associated rotor.

Figure 1:
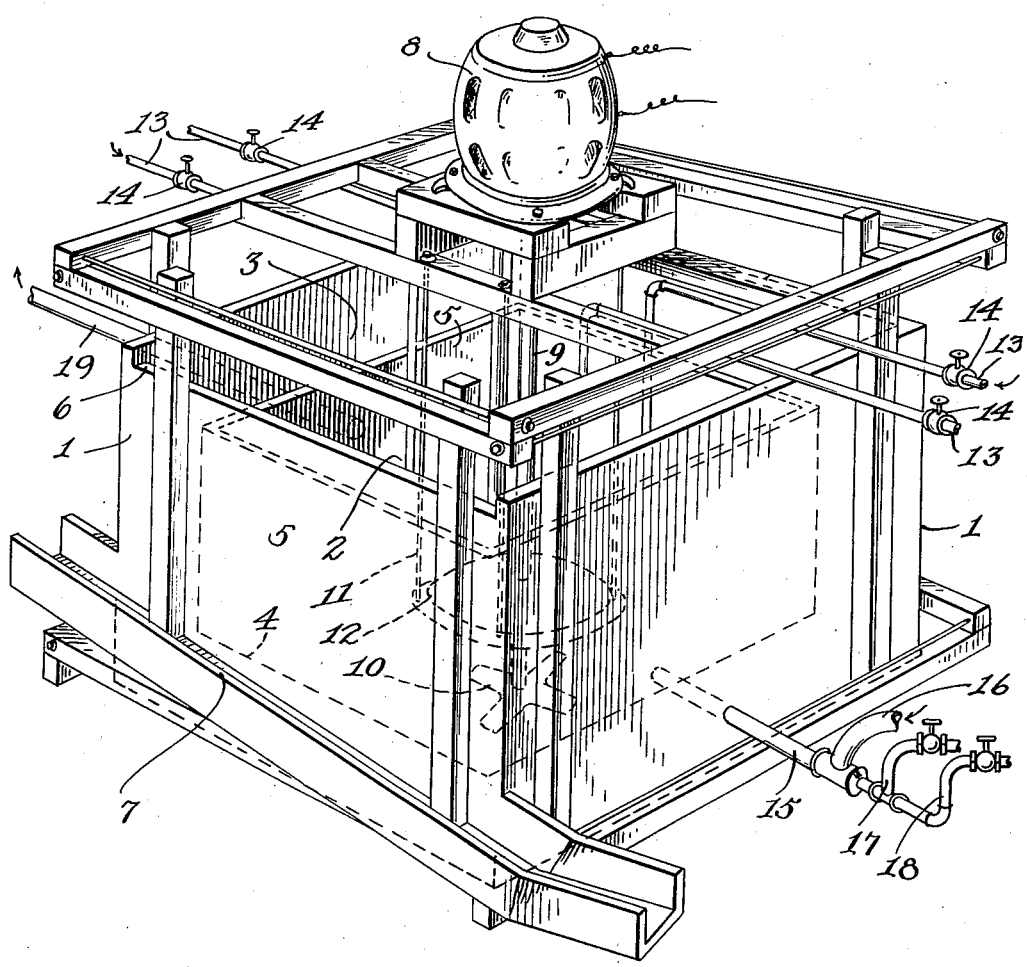

Referring to the drawings in more detail, numeral 1 indicates a tank which may be made of wood or any other desirable material. This tank is divided into two compartments, the inner compartment being referred to by the numeral 2, and the outer compartment being referred to by the numeral 3. In the specific form illustrated the outer compartment 3 extends entirely around the interior of the tank 1.

The compartment 3 is formed by the bottom 4, which in the present form is spaced above the bottom of the tank 1, and by the walls or partition 5 which are spaced inwardly from the walls of the tank 1. And it will be noted that the walls 5 of the compartment 3 terminate a considerable distance below the top of the tank wall, the purpose of which will appear hereinafter.

One of the tank walls has its upper edge cut away slightly, as indicated by numeral 6, to permit the impurities to float off into the launder 7.

Numeral 8 refers to a motor which is suitably mounted on the tank, and which drives a shaft 9 extending downwardly into the tank to a point near the bottom thereof. Mounted on the lower end of this shaft is a rotor 10, driven continuously by the motor.

Mounted at the desired distance above the rotor, as by means of rods 11, is a baffle 12 which in the preferred form here illustrated is dome-shaped. Numeral 13 refers to pipes which extend downwardly through the tank and terminate below the baffle 12, with their open ends directed inwardly. In the present form four of these pipes are shown. Compressed air is admitted through the pipes 13, for a purpose presently to appear, and the pipes are preferably provided with control valves 14.

Numeral 15 indicates the intake pipe, which leads into the lower portion of the tank, preferably at a lower level than the baffle 12, if a baffle is employed. It will be understood, of course, that the invention is not limited to the use of a baffle. The sand and reagents are delivered through pipe 16 to intake pipe 15, the volume being controlled by any desired means, and are delivered through the intake to the tank by means of water and compressed air through pipes 17 and 18, respectively; suitable control valves being provided in the pipes.

Numeral 19 indicates the outlet pipe through which the cleaned sand is delivered by gravity from the outer compartment 3; the outlet pipe being controlled by a valve 20.

The preferred form of the apparatus will be understood from the foregoing description, and its operation will now be described.

The sand which is to be treated has preferably been subjected to the usual steps of crushing, washing and screening. But the percentage of impurities in the sand, particularly iron, is too great after the usual washing, etc., to permit its use in glass batches. This sand is mixed with certain reagents and delivered to pipe 16, leading to intake 15. The particular reagents employed are well known and do not of themselves constitute a part of the present invention. I prefer to use either sodium ethyl xanthate or potassium ethyl xanthate, and cresylic acid in an amount depending upon the estimated alkalinity of the water, together with either sulfonated castor oil or pine oil.

The sand and reagents upon reaching the intake 15 are delivered therethrough to the tank, by means of water and compressed air from pipes 17 and 18, each of which is controlled by a valve.

The rotation of the rotor 10 causes the mixture to be driven upwardly against the baffle 12, breaking down large grains of silica and thoroughly mixing sand, reagents, air and water, allowing the reagents to treat the impurities in the sand, so that they will separate from the sand and float to the surface. The larger grains of sand will drop down below the rotor and will again be carried upward against the baffle, and the circuit will be repeated until the grains have been reduced to such a size that they will float upwardly. As the larger particles are broken down further impurities are carried to the surface, and in addition the grains are reduced to a uniform size, which is very desirable in the subsequent melting operation in the formation of the glass.

In the preferred form additional air under pressure is delivered beneath the baffle 12 by pipes 13, which air aids in mixing the substances and carrying the impurities to the surface; but the invention is not limited to the use of this additional air.

The small grains of sand float upwardly through the inner compartment 2, but before reaching the surface they float over the wall or partition 5 into compartment 3, and are drawn off continuously by gravity through outlet pipe 19, controlled by valve 20. The impurities float up to the surface of the tank and flow over the lip 6 into the launder 7.

This is a continuous process, the sand to be cleaned being continuously delivered through the intake and the cleaned sand being continuously carried off by gravity through the outlet, and there is no accumulation of sand at the bottom of the tank, for the larger particles are repeatedly driven against the baffle until they are reduced to such size that they will float upwardly over the wall or partition 5, which is well below the surface of the liquid in the tank. The outlet pipe is positioned at the proper distance below the level of the liquid in the tank to carry off the clean sand which has floated upward, and the impurities are carried all the way up to the surface by the oil and air bubbles and float over the edge or lip 6.

By this process the sand which originally contained such a large percentage of impurities, particularly iron, that it was unfit for use in the manufacture of glass, is freed of impurities to such an extent that it is now suited for glass making purposes. Or, if in some cases the original sand is of such poor quality that it cannot have its iron content so reduced as to be used by itself in glass making, it will at least be cleaned to the extent that it can be mixed in large proportions with other cleaner sand, for glass making. And, it will be understood, of course, that the invention also contemplates a series of two or more tanks, so that the cleaned sand carried off through pipe 19 can be delivered to another tank and have the process repeated, the number of times the sand is subjected to the treatment depending upon the quality of the original sand the grade of sand desired as the final product.

The importance of this invention in the glass making art will be apparent when it is remembered that sand suited for glass making is located only at widely scattered points, and that in the case of glass plants located at long distances from glass sand it is less expensive to import the glass sand from foreign countries. By the present invention, sand which was heretofore wholly useless for the making of glass is rendered suitable for that purpose. And further, the grains are reduced to uniform size, which is very desirable in the melting of the sand. As stated hereinbefore, while I have referred particularly to the cleaning of sand, it is to be understood that the invention applies equally well to clay, clayey substances, and other mineral products for ceramic and other industries, and wherever the word "sand" appears in the claims it is intended to include such other substances.

Having fully described the invention, what I claim as new is:

1. Apparatus for cleaning sand for glass batches including an agitator tank adapted to contain water, a partition within the tank having its top below the top of the tank and dividing the tank into an inner and outer compartment, said inner compartment being entirely within the boundaries of the agitator tank, said compartments being non-communicating except through the upper end of the inner compartment, means for delivering sand to the inner compartment, means for delivering reagents to the inner compartment to cause iron and other impurities in the sand to float to the surface of the inner compartment, means for causing the sand to rise and while below the surface of the water to pass into the outer compartment, and means for drawing off the sand from the outer compartment.

2. Apparatus for cleaning sand for glass batches, including an agitator tank adapted to contain water, a partition within the tank dividing the tank into an inner and outer compartment, the partition terminating below the surface of the water, said inner compartment being entirely within the boundaries of the agitator tank, said compartments being non-communicating except through the upper end of the inner compartment, means for delivering sand to one of the compartments, means for delivering reagents to the inner compartment to cause iron and other impurities in the sand to float to the surface of the compartment, means for causing the sand to rise and while below the surface of the water to pass over the partition into the other compartment, and means for drawing off the sand while in suspension in the last-mentioned compartment.

3. Apparatus for cleaning sand for glass batches, including a tank adapted to contain water, a partition within the tank dividing the tank into an outer and an inner compartment, a rotor mounted in the inner compartment, a substantially horizontal baffle extending over the rotor and spaced laterally from the walls of the inner compartment, means for delivering sand and reagents to the inner compartment and adjacent said rotor, said rotor having blades pitched to impel the sand and water against the baffle for breaking down the sand, and means for drawing off the sand from the outer compartment.

4. Apparatus for cleaning sand for glass batches, including a tank adapted to contain water, a partition within the tank dividing the tank into an outer compartment and an inner compartment, a rotor mounted in the inner compartment, an imperforate substantially horizontal baffle extending over the rotor and spaced laterally from the walls of the inner compartment, means for delivering compressed air to the inner compartment adjacent the rotor, means for delivering sand and reagents to the inner compartment adjacent the rotor, said rotor having blades pitched to impel the sand and water against the baffle for breaking down the sand, and means for drawing off the sand from the outer compartment.

5. Apparatus for cleaning sand for glass batches, including a tank adapted to contain water, means for delivering sand to said tank, means for delivering reagents to said tank to cause iron and other impurities in the sand to float to the surface, a substantially horizontal imperforate baffle mounted in said tank and spaced laterally from the walls thereof, a rotor arranged between the baffle and the bottom of the tank, said rotor having blades pitched to repeatedly throw larger grains of sand against the baffle, to reduce the sand grains to substantially uniform size, and means for drawing off the cleaned sand before it reaches the surface of the water in the tank.

ORTA D. SISSON.